United States Patent
Ohresser et al.

(10) Patent No.: US 8,088,423 B2
(45) Date of Patent: Jan. 3, 2012

(54) METHOD FOR DELIVERING A COFFEE EXTRACT FROM A CAPSULE

(75) Inventors: Sylvia Ohresser, Nürnberg (DE); Paul Eichler, Arnex-sur Orbe (CH); Peter Koch, Orbe (CH); Ernest Raetz, Lignerolle (CH)

(73) Assignee: Nestec S.A., Vevey (CH)

( * ) Notice: Subject to any disclaimer, the term of this patent is extended or adjusted under 35 U.S.C. 154(b) by 460 days.

(21) Appl. No.: 12/374,819

(22) PCT Filed: Jul. 11, 2007

(86) PCT No.: PCT/EP2007/057071
§ 371 (c)(1),
(2), (4) Date: Jan. 23, 2009

(87) PCT Pub. No.: WO2008/012202
PCT Pub. Date: Jan. 31, 2008

(65) Prior Publication Data
US 2009/0186137 A1      Jul. 23, 2009

(30) Foreign Application Priority Data
Jul. 24, 2006  (EP) ..................................... 06015330

(51) Int. Cl.
*A23F 5/36* (2006.01)
(52) U.S. Cl. ......................................... 426/433; 426/594
(58) Field of Classification Search .................. 426/433, 426/594
See application file for complete search history.

(56) References Cited

U.S. PATENT DOCUMENTS

| | | | | |
|---|---|---|---|---|
| 3,149,977 A | * | 9/1964 | Baldwin et al. | 426/240 |
| 2005/0183581 A1 | | 8/2005 | Kirschner et al. | 99/295 |

FOREIGN PATENT DOCUMENTS

| EP | 844 195 A1 | 5/1998 |
|---|---|---|
| EP | 844 195 B1 | 5/1998 |
| EP | 1 566 127 A2 | 8/2005 |
| EP | 1 566 127 A3 | 8/2005 |
| EP | 1 566 127 B1 | 8/2005 |

OTHER PUBLICATIONS

International Search Report PCT/EP2007/057071 Dated Oct. 10, 2007.

* cited by examiner

*Primary Examiner* — Anthony Weier
(74) *Attorney, Agent, or Firm* — Winston & Strawn LLP (57) ABSTRACT

A method for delivering a long coffee extract from a capsule containing ground coffee within a flow time of 50 seconds or less by injection of water under pressure within the capsule. The capsule is filled with ground coffee and has a delivery membrane. The capsule is extracted in a coffee extraction device, and pressurized water is injected in the capsule under pressure. The coffee beverage is released through the beverage delivery membrane of the capsule with engaging means engaging in and/or against the membrane. The pressure loss is reduced in the coffee bed by providing in the capsule coffee ground having a controlled percentage of fines (F) depending on the average particle size (D4,3). The flow time can be lowered to 40 seconds or even less while maintaining a coffee extraction yield within a high range of 15 to 30%.

20 Claims, 5 Drawing Sheets

METHOD FOR DELIVERING A COFFEE EXTRACT FROM A CAPSULE

This application is a 371 filing of International Patent Application PCT/EP2007/057071 filed Jul. 11, 2007.

BACKGROUND ART

The present invention relates to a method for delivering coffee beverages from capsules designed to be extracted under pressure and containing a substance for the preparation of a coffee beverage.

Coffee cups can be produced from filter coffee machines. However, as a result of a "light" extraction of the coffee, the resulting extract usually has low coffee solids concentration, a low aroma profile, and little or no "crema" on the top.

Capsules designed to be extracted under pressure and containing a substance for the preparation of a beverage exist on the market. They provide a better extraction of coffee, i.e., a higher "extraction yield", more aroma and a better "crema", more convenience in operation and they ensure freshness of the substance contained therein. As a result, the delivery of freshly extracted beverages of constant quality is better ensured.

For instance, the actual system commercialized under the trademark "Nespresso®" is appreciated for producing good quality short cups of coffee and long cups of coffee. A short cup of coffee is defined as containing less than 50 grams of coffee liquid extract in the cup and more specifically about 40 g for the espresso type and about 25 g for the Ristretto type. Due to the high pressure extraction conditions maintained in the capsule, in the order of 10-20 bar, the liquid extract which is delivered can be given desirable quality attributes in terms of coffee yield, coffee solids and "crema" and within a delivery flow time which is found acceptable for the user. Some consumers however, prefer to have the option to also prepare a long cup of coffee with the existing capsules. A long cup of coffee is defined as containing about 110 (+/−10) grams of coffee liquid extract in the cup. In order to deliver a longer cup of coffee, a higher amount of water needs to be sent through the capsule. Therefore, typically a "long coffee" takes a too long time to be delivered, i.e., one minute or more, and the resulting beverage can taste too bitter and harsh and might be slightly thin or watery. The delivery time, which exceeds one minute, is also unacceptable on a commercial standpoint and inconvenient to the consumer who wants to prepare several cups in a row.

EP 1 566 127 A2 has proposed a solution for a system adapted to deliver a short or long coffee using the same coffee extraction device and the same capsule format. The long coffee capsules have a retaining membrane of puncture resistance of from 0.6 to 1.1 mJ and a coffee granulometry of from 300 to 600 microns.

The present invention aims at a significant improvement to the capsule system of the prior art. In particular, a main objective is to reduce flow time of the coffee capsules to deliver a long coffee extract while at the same time maintaining or even improving the quality attributes of the coffee, in particular, a desirable strength (e.g. expressed by its "extraction yield") and also a sufficient thickness and texture of crema.

SUMMARY OF THE INVENTION

The invention is based on the general findings that the pressure loss in the coffee bed of the capsule is reduced compared to the prior art. At the same time, the pressure loss at the membrane/opening plate interface of the capsule can be increased compared to prior art. Indeed, it was surprisingly found that the crema attribute can be significantly increased by increasing the pressure loss at the membrane/opening plate interface. Decreasing of the pressure loss in the coffee bed itself can reduce or at least maintain within desired limits the flow time for the delivery of a long cup of coffee. However, reducing the pressure loss in the coffee bed cannot be carried out without reducing the extraction yield of coffee, which would lead to a coffee with insufficient strength and/or aroma. Therefore, the invention has found a solution to maintain a high coffee extraction level providing relatively less resistance in the coffee bed to the fluid flow as compared to prior art capsule systems in order to reduce the overall coffee delivery time.

The invention is thus based on the finding that the granulometry of the coffee bed with a control of the fines level in the coffee bed plays a key role in the reduction of the pressure loss in the coffee bed while maintaining the desired coffee extraction level. The invention is also based on the principle of reducing the level of fines in the ground coffee; such level of fines providing a faster flow while not significantly affecting the extraction yield of the resulting coffee extract.

Therefore, the present invention relates to a method for delivering a long coffee extract from a capsule containing ground coffee within a flow time of 50 seconds or less per 110 ml extract by injection of water under pressure within the capsule, wherein the capsule is filled with ground coffee and has a delivery membrane;

wherein the capsule is extracted in a coffee extraction device and pressurized water is injected in the capsule under pressure;

wherein the coffee beverage is released through the beverage delivery membrane of the capsule with engaging means engaging in and/or against the membrane;

wherein the pressure loss is reduced in the coffee bed by providing in the capsule ground coffee having a controlled percentage of fines (F) depending on the particle size ($D_{4,3}$) within the following limits:

F is lower than or equal to 14% when $D_{4,3}$ is measured from 350 to 400 microns, F is lower than or equal to 16% when $D_{4,3}$ is measured from 300 to 349 microns, F is lower than or equal to 18% when $D_{4,3}$ is measured from 250 to 299 microns.

More particularly, the method comprises filling the capsule with ground coffee having a controlled percentage of fines (F) depending on the particle size within the following limits:

F is between 10 and 14% when $D_{4,3}$ is measured from 350 to 400 microns,

F is between 12 and 16% when $D_{4,3}$ is measured from 300 to 349 microns,

F is between 14 and 18% when $D_{4,3}$ is measured from 250 to 299 microns.

Even more preferably, the capsule contains ground coffee having a controlled percentage of fines (F) depending on the particle size within the following limits:

F is comprised between 12 and 14% when $D_{4,3}$ is measured between 300 and 350 microns.

A control of the level of fines as determined as a function of the average particle size of the coffee grind enables to decrease the pressure loss in the coffee bed, consequently significantly reducing the flow time.

Preferably, a single grinding within the aforementioned specific ranges of $D_{4,3}$, is dosed and filled in the capsule to achieve the method of the invention.

According to the method of the invention, the long coffee extract is preferably delivered in a flow time between 27 and 45 seconds. The flow time can even be reduced to less than 35 seconds. The flow time is reduced while the extraction yield of the delivered coffee extract is maintained of from 15 to 30%. More preferably, the extraction yield of the delivered coffee extract is maintained between 20 and 26%.

In addition, the pressure loss at the membrane/engaging means interface can be increased to provide improved quality attributes, in particular, to improve the production of crema. The flow time can be maintained or even preferably reduced if the increase of pressure at the membrane is compensated by a reduction of the fines. Preferably, a crema is formed on the top of the coffee extract which experiences a stability at the sugar test of more than 10 seconds. More preferably the crema experiences a stability at the sugar test of between about 11 and 15 seconds.

Pressure loss at the membrane/engaging means interface can be increased by having a membrane which has a higher puncture resistance than a typical membrane for delivering long coffee extracts. Preferably, the membrane has a puncture resistance of at least 1.1 mJ. Even preferably the membrane has a puncture resistance of between 1.1 mJ and 3.5 mJ. Most preferably, the membrane has a puncture resistance of between 1.35 and 3.2 mJ.

Another advantage of membranes having a relatively high puncture resistance is that the membrane can be more reliably sealed to the capsule's body. In particular, there is a lower risk of defective seal that could accidentally break during extraction under the pressure of fluid and which would cause the coffee ground to dirty the extraction device.

Pressure loss could also be controlled by other means such as by choosing a specific design of the opening plate (e.g., more cutting or perforating design).

The membrane can be made of different material such as aluminium, aluminium alloy and/or plastic.

In a preferred example, when the membrane is made of aluminium or aluminium alloy, the membrane has a thickness comprised between 26 and 40 microns, even more preferably of about 30 microns.

In order to obtain a reduction of fines in the capsules, one possible method may consist in grinding the coffee beans (before filling the capsules) by using a grinder with at least one pair of rolls having radial corrugation in the fine grinding section as opposed to longitudinal corrugation. Good results have been obtained by grinding coffee using at least 3 stages, preferably 4 stages with at least one roll being radially corrugated. The best results have been obtained by at least 4 stages, most preferably 6 stages, using only grinding rolls with radial corrugation.

The coffee in the capsule can be filled in a loose state in the capsule, i.e., without compacting step before or after filling it in the capsule. Alternatively, the coffee can be densified before the filling step using a densifying device. However, the coffee is not compacted in a solid block in the capsule but remains in a flowing state in the capsule.

In a still a preferred example, the opening plate for the delivery membrane is formed of a network of protruding reliefs, preferably, a number comprised between 20 and 50; each relief having a flat upper surface of individual surface area comprised between about 0.5 and 5 mm². More preferably, the upper surface of each individual surface area of the relief is comprised between 0.8 and 3 mm². Such an opening arrangement may also participate to generate a pressure loss that is sufficient to form a better crema.

DETAILED DESCRIPTION OF THE PREFERRED EMBODIMENTS

In the present application, terms are utilized for which the definitions are given as a preamble below.

The "extraction yield" is defined as the weight of total solids in the liquid extract divided by the total weight of starting coffee ingredients in the capsule (e.g., roast and ground coffee). This value is typically expressed as a percentage. The extraction yield is representative of the strength of the coffee extract.

The "total solids" is defined as the weight of extracted solids contained in the extract divided by the total weight of the extract. This value is typically expressed as a percentage.

The "injection pressure" is defined as the maximal pressure expressed in bar and measured at the injection point(s) in the capsule during extraction.

The "flow time" is defined as the time from the first moment of fluid dropping into the coffee cup to the moment the extracts has been delivered into the cup with the desired weight, strength and aroma.

"Long coffee extract" is defined as the liquid extract as obtained from the capsule with a weight of about 110 g (+/−10 g).

The average particle size "$D_{4,3}$" represents the mean volume diameter of the coffee grind as obtained by laser diffraction method using a Malvern® optical instrument and butanol as dispersing agent for the particles.

The "fines" are considered as being coffee particles having a diameter of less than 88.91 microns when measured by the Malvern® laser diffraction method.

A "stage" for grinding coffee in a grinder represents a pair or rolls.

The "delivery membrane" is meant to be the wall of the capsule from which the coffee is delivered comprising at least one beverage outlet provided after opening by any suitable method including cutting, puncturing and/or tearing or eventually a pre-formed beverage outlet.

The "puncture resistance", expressed in milli-Joules, is defined as the energy needed to puncture the membrane of the capsule by using a MTS Synergie 400 tensile equipment supplied by Fuch Industrievertretungen (Switzerland) as further described in EP 1566127 A2; the content of which is included here by reference.

The "granulometry" of the ground coffee is defined as the diameter of the coffee particles as resulting after grinding as explained in the examples.

The "crema" is defined as the head of foam created on the coffee extract with a texture of substantially small bubbles. The crema attribute can be measured by an empirical sugar test which consists in arranging a well defined crystal sugar layer, i.e., sugar of average particle size $D_{4,3}$ of 660 microns on top of a freshly prepared cup of coffee and measuring the elapsing time between the start of overlaying and the main part of sugar's sinking. The "sugar test value" is thus a number of seconds.

The "engaging means" represents an element of the extraction device or capsule having the function of engaging in or pressing against the membrane to provide a certain pressure loss that enables to delay the release of coffee out of the capsule. The engaging means can take various forms able to provide in conjunction with the membrane a certain pressure loss such as a central needle or multiple needles or a plate with multiple protrusions and/or bumps, or a filter plate.

The present invention relates to a system that uses closed capsules and their attached benefits, as aforementioned, to provide beverages of long volume.

Although the key quality attributes are generally known for espresso-type coffee, there have been very little studies able to determine precisely a definition of a long cup of coffee, which corresponds to the consumers' preference. For a long cup of coffee, key quality attributes can be determined by different means such as by consumer tests and focus groups. Key quality attributes essentially encompass the extraction yield, the total solids and crema. It has been found that the extraction yield must preferably be maintained within a certain range. If the extraction yield is too high, the coffee is usually considered as bitter and harsh because non-desirable compounds may have been extracted over a too long time of extraction. Therefore, not only is it important to shorten the delivery of a long coffee extract for the obvious reason of reduction of the waiting time but also a shorter delivery time tends to avoid the problems linked to the over-extraction of the coffee. Conversely, if the extraction yield is too low, the coffee tastes watery and is also not found acceptable by the average consumer. Therefore, it has been determined that an appropriate range of extraction yield is usually of from 15 to 30%, more preferably 18 and 28%, most preferably 20 and 26%. Similarly, the amount of total solids in the cup must be sufficient to confer sufficient body and texture to the beverage otherwise the coffee tastes watery and does not find consumer acceptance. Therefore, although it may also be a matter of preference, the best concentration of total solids for a long beverage has been determined to be within a range of from 1.0 to 1.9% wt, even more preferably 1.1 to 1.7% wt, most preferably 1.1 to 1.5% wt. Proper extraction yields and total solids can be obtained with capsules containing about 5.5 and 7 grams of coffee, preferably, between 5.8 and 6.8 grams of coffee.

Finally, crema is also considered in a long cup of coffee as an important quality attribute and a long cups of coffee should deliver a sufficiently thick and stable crema. The crema should be covering the whole surface of the beverage in the cup without leaving any black holes. This is particularly challenging since the surface of the long coffee extract is usually much larger than that of the short coffee extract (e.g., considering the difference between a coffee mug and an espresso cup). The crema should also be creamy or velvety in texture, as opposed to soapy or bubbly. Its colour should be brownish to reddish and not white. Therefore, the sugar test should show a value of over 7 seconds and preferably more than 10 seconds.

Figure 5:
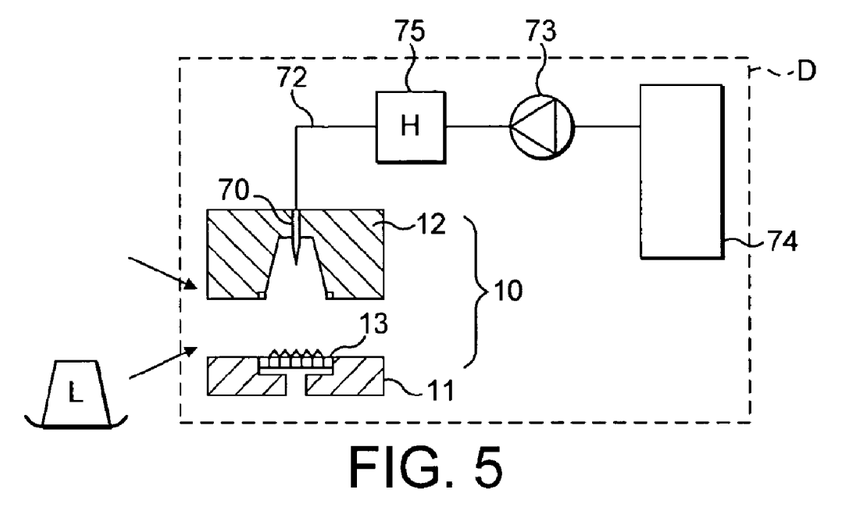
FIG. 5 shows a schematic representation of the system of the invention before insertion of the capsule.
Figure 6:
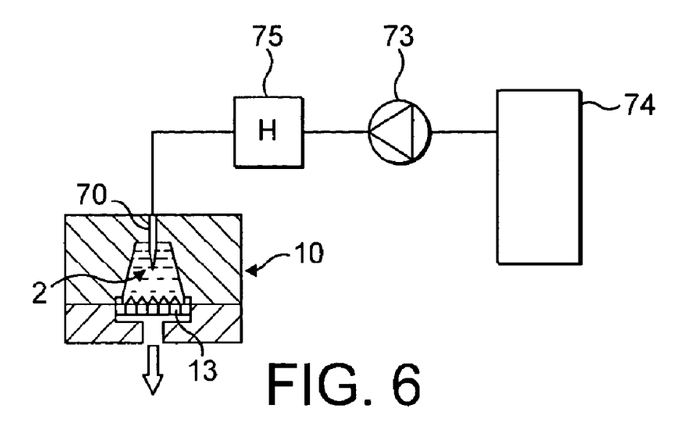
FIG. 6 shows a schematic representation of the system; the device being closed and a cartridge being extracted in the device.

FIGS. 5 and 6 schematically illustrate an exemplary system of the invention. The device D of the invention comprises an extraction module 10 for extracting coffee from one capsule at a time. The extraction module comprises receiving means in the form of a support base or collector 11 and an injection part 12. The support base and injection part defines an internal volume upon closing of the two parts to receive the capsule. In the support base is located engaging means 13 arranged to engage with a retaining part of the capsule when pressure of fluid is built inside the capsule. The engaging means 13 may be piercing means such as a series of protruding elements such as pyramids, a network of elongated ribs or needles which are provided on the surface of a plate. The coffee extract is primarily filtered by the very narrow spacing produced between the protruding elements and the edges of the openings of the membrane. The plate comprises a series of apertures to drain the extract and eventually retain any solid coffee particles. The apertures may be provided through the plates in channels formed between the protruding elements or alternatively, be provided through the protruding elements themselves.

The device further comprises at least one fluid line 72 to which the fluid can be supplied in the capsule via at least one injector 70. The injector may comprise one or more needles or blades, which create one or more passages for water to enter in the capsule. The fluid is supplied under pressure in the line by means of a pump 73. The pump may be an electromagnetic piston pump or any suitable water pumping mechanism such as a diaphragm pump or pressurized head systems. A reservoir of fluid 74 can be installed upstream the pump 73 to enable fluid to be supplied in sufficient amount for delivering fluid to extract more than a capsule. Preferably, the reservoir holds more than 750 ml of water so as to eliminate the inconvenience of repeatedly refilling the reservoir after a few extraction cycles. A heating system 75 can be installed along the line between the reservoir and the extraction module 10 to heat the fluid within a required temperature range. The heater is configured to heat the water to a temperature of extraction of between 70 to 100° C. It can be a thermoblock or an instant heating device such as ceramic heating cartridges. The reservoir could also be such as a boiler that can keep the fluid warm or hot. A control board with switches is also usually helpful to automatically start the extraction cycle. Different controls can be added such as temperature sensors, timers, flow meters, pressure sensors, vanes, probes and so on for controlling and monitoring the extraction operations.

The coffee capsule L has a body 20 and a membrane 21 made of a material such as aluminium and/or plastic. The capsule can take many different shapes without departing from the scope of the invention. The membrane could also be formed as the bottom of the body itself. The membrane can take a predefined shape before (e.g. convex or concave) and deforms against the engaging means 13 during extraction.

According to one important aspect of the invention, the capsule is filled with ground coffee of controlled particle size and reduced level of fines.

The capsule may be flushed at a slight overpressure with an inert gas to increase the shelf life of the coffee inside. The membrane can take a slight convex shape as a result of the internal pressure of gas. Inert gas is typically nitrogen but other inert gas could be used. Carbon dioxide gas from the coffee also participates to the inside building of gas pressure as a result of ground coffee de-gassing inside the capsule after filling and sealing of the capsule. Therefore, the membrane should be sufficiently resistant to withstand the internal pressure of gas including the gas from de-gassing.

When the extraction module 10 is closed around the capsule 2 and the capsule is positioned in the module, as shown in FIG. 6, the retaining member, i.e., hereafter called "membrane", is positioned adjacent or at a short distance from the engaging means 13 of the device. The membrane of the capsule is not opened until a certain opening pressure is built within the capsule by virtue of water coming in the capsule. The membrane and engaging means are so arranged to not create an accidental opening before extraction begins. Therefore, as water is entering within the capsule pumped by the pump means 75, the internal pressure builds up inside the capsule which forces the membrane 21 to deform and press on the engaging means 13 up to a point where it becomes pierced or torn open. The capsule starts opening at a certain opening pressure but pressure usually continues increasing due to the compaction of the bed of ground coffee inside the capsule and also due to the pressure drop created by the narrow openings torn or pierced through the membrane of the capsule. Then, the pressure level usually flattens to a pressure of extraction, which is typically of several bars and then drops when the pump is shut off. The overall pressure loss is usually the addition of the pressure loss created by the compacted coffee bed and the pressure loss created by the conjunction of the small openings through the membrane and the engaging plate 13 of the device. The water pressure of extraction reaches a value higher than 11 bar at the injection side in the capsule. It can be noted that the engaging plate could be a part of the capsule itself. It can be noted that the membrane of the capsule can be pre-opened before water injection such as by one or more needles of the engaging plates.

The pump has a fixed performance characteristic curve which means that it delivers a certain flow rate of water when downstream the pump has to overcome a certain pressure depending on the characteristics of the capsule (granulometry, membrane, etc.).

The invention is based on the principle that the pressure loss in the coffee bed has been significantly reduced as compared to the pressure loss of the coffee bed in the capsules of the existing systems while at the same time substantially maintaining the coffee extraction characteristics (i.e., the extraction yield).

For that, the granulometry of the coffee ground in the capsule has been modified with a reduced level of fines. Preferably, the percentage of fines (F) is related to the measured range of particle size ($D_{4,3}$). When the particle size increases, the amount of fines usually inversely decreases. The finer the coffee is ground, the more fines are created. According to one preferred aspect of the invention, the percentage of fines F is determined as a function of $D_{4,3}$ within the following preferred limits:

F is between 10 and 14% when $D_{4,3}$ is measured from 350 to 400 microns,

F is between 12 and 16% when $D_{4,3}$ is measured from 300 to 349 microns,

F is between 14 and 18% when $D_{4,3}$ is measured from 299 to 250 microns.

Preferably, the capsule is filled with one single selected grinding having a selected particle size $D_{4,3}$. In other words, two or more grindings having different particle sizes ($D_{4,3}$) are not mixed for filling a capsule.

Even more preferably, the percentage of fines (F) of the capsule for delivering a long coffee extract is comprised between 12 and 14% when $D_{4,3}$ is measured from 300 and 350 microns, therefore allowing to deliver a long coffee extract in less than 45 seconds, preferably in about 35 seconds. It has been found that above 350 microns, extraction of the coffee mass is less effective. It is supposed that the surface of contact between the extraction fluid and the coffee particles is reduced thus affecting the extraction principle. Too large particles also require a longer degassing time for the coffee after grinding during the manufacturing. Below 300 microns, the flow time may also be accelerated as well but the coffee extraction may be less effective due to uneven distribution of the water in the coffee bed, called channeling.

The granulometry with a reduced level of fines enables to control the flow time for long coffee extract. In particular, a flow time of between 30 and 45 seconds can be successfully obtained.

The following examples further illustrate the invention in a non-limiting manner.

EXAMPLES

Figure 1:
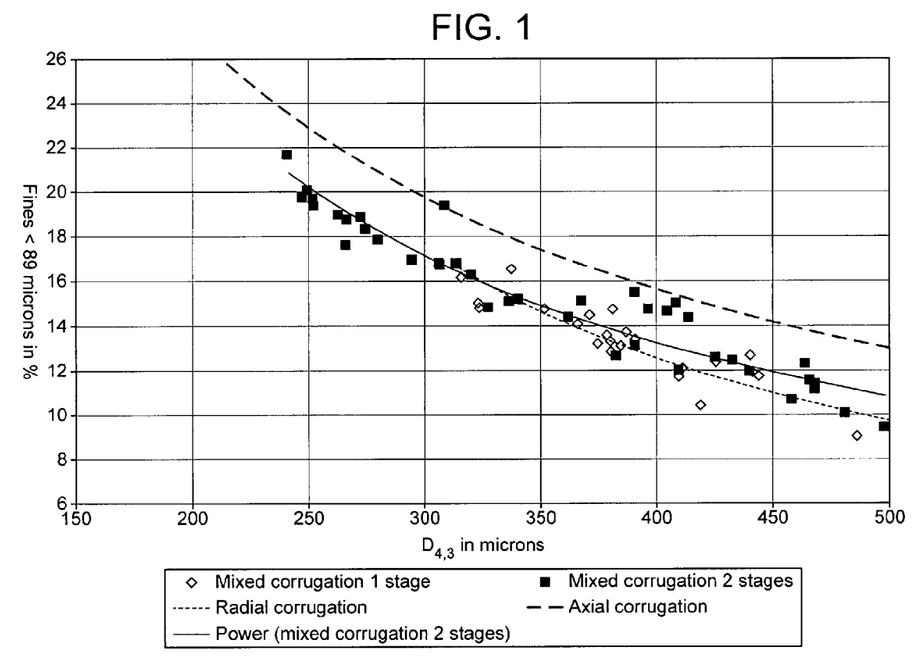
FIG. 1 is a graphic showing the relation between the average particle size and fines level according to different grinding technologies.

1. Grinding Technology:

The graphic of FIG. 1 illustrates the relation between the average diameter $D_{4,3}$ and the percentage of fines considering different grinding technologies. A grinding technology utilizing six stages representing 6 pairs of radially corrugated rolls has led to obtain a reduced level of fines as compared to a grinding technology using only axially corrugated rolls or a mixed corrugation (i.e., both radial and axial rolls on one or two stages of the fine grinding section). The graph also shows that the use of a grinder having mixed rolls provides a lower level of fines as compared to axial corrugation only.

Figure 2:
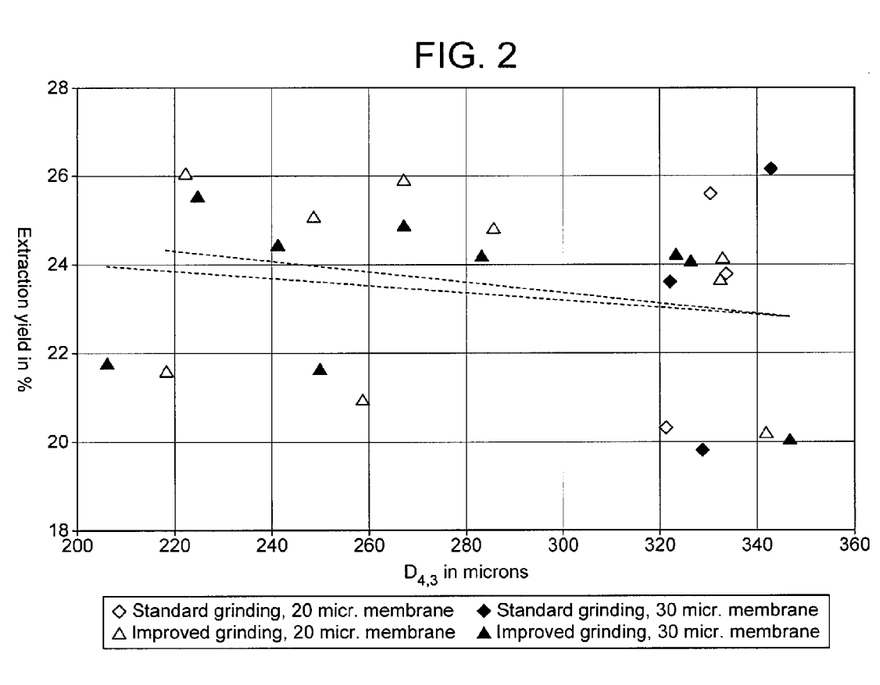
FIG. 2 is a graphic showing the relation between the average particle size and the extraction yield in the delivery of long coffee extracts.

2. Impact of Particle Size ($D_{4,3}$) and Membrane Thickness on Extraction Yield:

The graphic of FIG. 2 shows the impact of the average particle size on the coffee extraction yield when extracting long coffee extracts from the capsules with different thicknesses of the aluminium delivery membrane. Tests have been done, respectively, with 20-micron and 30-micron aluminium membranes. The average puncture resistance of the 20-micron membrane was measured at about 0.7 mJ and its maximal puncture resistance was measured at about 0.81 mJ. The average puncture resistance of the 30-micron membrane was measured at about 1.45 mJ and its minimal puncture resistance was measured at about 1.1 mJ. Tests also encompass different grinding technologies, respectively, using full radial corrugation (6 stages as defined in Example 1) or, alternatively, full axial corrugation. Radial corrugation led to a significantly reduced level of fines as compared to axial corrugation as exemplified in FIG. 1. The results on the extraction of capsule having different fine levels show that the extraction yield is finally not significantly affected. It also shows that a finer grinding, i.e., between 200 and 300 microns, gives a slightly higher extraction yield as compared to coarser grinding (i.e., above 300 microns).

Figure 3:
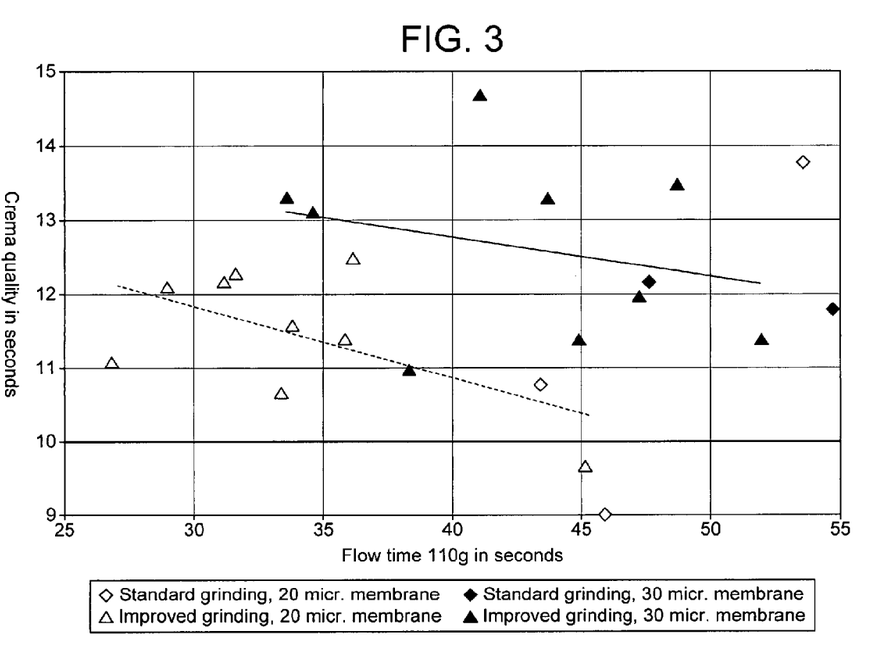
FIG. 3 is a graphic showing the relation between flow time and the quality of crema in the delivery of long coffee extracts.

3. Impact of Flow Time, Grinding Technology and Membrane Thickness on Crema:

The graphic of FIG. 3 shows the impact of flow time and membrane thickness on the quality of crema. The results show that a capsule extracted with a thicker membrane (i.e., 30 microns) provides a better crema than a capsule extracted with a thinner membrane (i.e., 20 microns) at substantially the same flow time. The results also show that an axial corrugation generating higher level of fines provided a faster flow (with 20-micron instead of 30-micron membrane) but with less crema. Finally, grinding with radial corrugation provided an improved crema at 35 seconds flow time when a thicker membrane is utilized (i.e., 30 microns).

Figure 4:
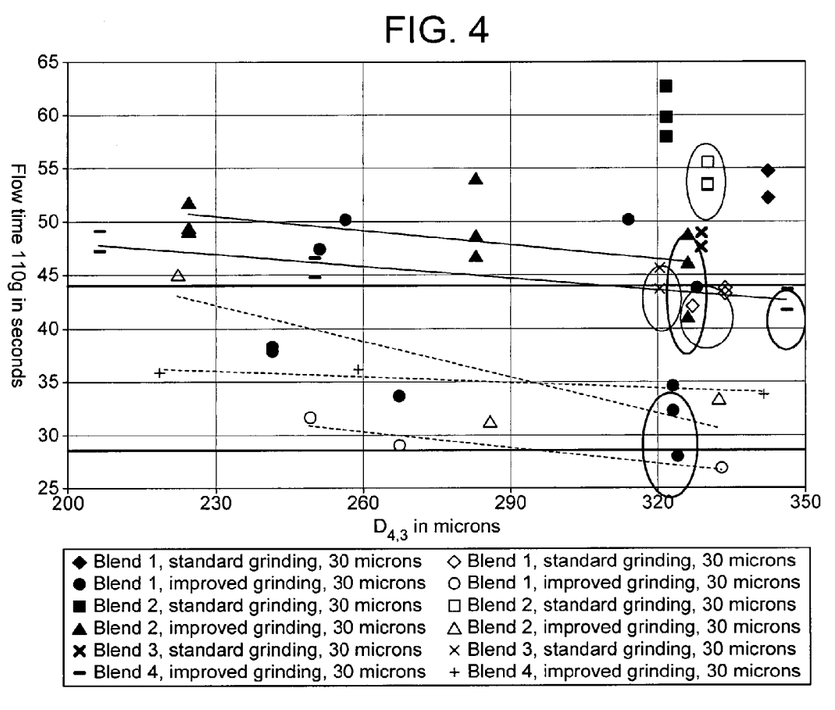
FIG. 4 is a graphic showing the relation between the average particle size ($D_{4,3}$) and flow time in the delivery of long coffee extracts.

4. Impact of Granulometry (Average Particle Size/Fines) on Flow Time:

The graphic of FIG. 4 shows the impact of the average particle size ($D_{4,3}$), grinding technology (related to fine levels) and membrane thickness on the flow time.

Three different coffee beans blends for long cups, respectively, "Blend 1", "Blend 2" and "Blend 3" were tested. The coffee beans were ground using either axial or radial corrugation grinding technologies. The capsules were filled with the resulting ground coffee and were tested with different membrane thicknesses, respectively 20 and 30 microns.

The results show that flow time can be significantly reduced when the ground coffee has a reduced level of fines (i.e., radial corrugation grinder used) compared to coffee ground of typical level of fines. This also shows that the flow time is significantly reduced when both the fines level is reduced and the membrane is made thicker (i.e., 30 microns). In some instances, flow time can even be reduced below 30 seconds at a particle size comprised between 260 and 320 microns.

It must also be noted that the coffee origin(s), the blend is made of, can also impact significantly on the flow time. Therefore, for a same blend using same origin(s), the invention provides a significant improvement of the flow time.

5. Granulometry:

The particle size distribution ($D_{4,3}$) and fines level (F) were determined by laser diffraction using a "Mastersizer S" instrument from Malvern® equipped with a 1000 mm optical lens. 1-2 g of powder are dispersed in 1 liter of butanol and recirculated in front of the laser beam in order to obtain an obscuration between 15 and 20%. The particle size distribution is obtained by Fraunhofer approximation of the diffraction pattern. The complete experiment is repeated 3 times (or until the StDev<5%) and the results are averaged.

6. Sugar Test for Crema Measurements:

The mechanised sugar test device is composed of a small sugar-containing silo. The prismatic V-shape of this silo comprising a defined slit (2 mm×40 mm) at the bottom edge can create a uniform sugar curtain as long as the slit is free and a minimum of sugar remains in the silo. This silo can be moved horizontally, with controlled speed (~40 mm/s) from one point "A" to a point "B" (distance between A and B is 20 cm). In the end position at both points a baffle prevents the sugar from flowing out if the device is in stand-by mode. When the silo is moved, the sugar curtain is produced all the way between the two points "A" and "B". The crema in a cup that is placed at 60 mm below this path within the two points will be toped with a uniform layer of sugar when the silo passes over it. The chronograph is started when the sugar layer is positioned on the foam's layer. The amount of sugar (a thickness of the layer to obtain a precise weight of 5 g of sugar) deposed in the cup is adjustable by varying the speed of the silo or the dimensions of the slit. The sugar is crystal sugar of $D_{4,3}$ equal to 660 microns.

A precise waiting period (i.e., 10 sec. for long cups) must be observed between the end of extraction and the start of the sugar test.

The sugar layer remains some time on top of the crema. Later, when the main part of the sugar sinks suddenly the observing operator must stop the chronograph.

The "sugar test value" is the number of seconds shown by the chronograph.

The invention claimed is:

1. A method for delivering a coffee extract from a capsule containing ground coffee within a flow time of less than 35 seconds per 110 g extract by injection of water under pressure within the capsule, which method comprises:
providing a ground coffee containing capsule for extraction in a coffee extraction device where water is injected into the capsule under pressure to deliver the coffee extract, the capsule having a delivery membrane and filled with a bed of ground coffee; wherein the delivery membrane initially retains the ground coffee therein until the coffee beverage is released through the delivery membrane of the capsule with engaging means engaging in or against the membrane to provide an exit for the coffee beverage; and
reducing pressure loss at the interface of the membrane and engaging means by providing a membrane having a puncture resistance of between 1.1 and 3.5 mJ; and by providing in the capsule ground coffee having an average particle size of less than 350 microns, and a controlled percentage of fines (F) depending on the average particle size (D4,3) within the following limits:
F is between 12 and 16% when D4,3 is measured from 300 to 349 microns, and
F is between 14 and 18% when D4,3 is measured from 250 to 299 microns.

2. The method according to claim 1, wherein the percentage of fines (F) of the capsule for delivering a long coffee extract is comprised between 12 and 14% when D4,3 is measured from 300 and 349 microns.

3. The method according to claim 1, wherein the pressure loss at the interface of the membrane and engaging means is increased by selecting a membrane made of aluminum having a thickness of between 26 and 40 microns.

4. The method according to claim 1, wherein the pressure loss at the interface of the membrane and engaging means is increased by selecting an aluminum membrane having a thickness of about 30 microns.

5. The method according to claim 1, wherein the level of fines is controlled by having coffee beans ground before the filling in the capsule, wherein the beans are ground using a grinder comprising a fine grinding section that includes at least one pair of radially corrugated rolls.

6. The method according to claim 5, wherein coffee is ground using only radially corrugated rolls.

7. The method according to claim 6, wherein coffee is ground using between 4 to 6 stages of radially corrugated rolls.

8. The method according to claim 5, wherein coffee is ground using radially and axially corrugated rolls.

9. The method according to claim 1, wherein the coffee extract is delivered in a flow time between 27 and 35 seconds.

10. The method according to claim 1, wherein the coffee extract is delivered at an extraction yield of between 15 and 30%.

11. The method according to claim 10, wherein the extraction yield of the delivered coffee extract is between 20 and 26%.

12. The method according to claim 1, wherein the delivered coffee extract has a total solids of between 1 and 1.9% wt.

13. The method according to claim 1, wherein the delivered coffee extract has a total solids of between 1.1 and 1.7% wt.

14. The method according to claim 1, wherein the water pressure injected into the capsule reaches a value higher than 11 bar during extraction.

15. A method for delivering a coffee extract from a capsule containing ground coffee within a flow time of less than 35 seconds per 110 mL extract by injection of water under pressure within the capsule, which method comprises:
providing a ground coffee containing capsule for extraction in a coffee extraction device where water is injected into the capsule under pressure to deliver the coffee extract;
providing the capsule with a delivery membrane having a puncture resistance of between 1.1 and 3.5 mJ;
providing coffee ground using a grinder comprising a fine grinding section that includes at least one pair of radially corrugated rolls to provide ground coffee having an average particle size of less than 350 microns, and a controlled percentage of fines (F) depending on the average particle size (D4,3) within the following limits:

F is between 12 and 16% when D4,3 is measured from 300 to 349 microns, and

F is between 14 and 18% when D4,3 is measured from 250 to 299 microns;

filling the capsule with a bed of the ground coffee wherein the delivery membrane initially retains the ground coffee in the capsule; and delivering a coffee beverage after the water pressure injected into the capsule reaches a value higher than 11 bar by releasing the coffee beverage through the delivery membrane of the capsule with engaging means engaging in or against the membrane to provide an exit for the coffee beverage, thus delivering a coffee beverage having a total solids of between 1 and 1.9% wt. and an extraction yield of between 15 and 30%.

16. The method according to claim 15, wherein the percentage of fines (F) of the capsule for delivering a long coffee extract is comprised between 12 and 14% when D4,3 is measured from 300 and 349 microns.

17. The method according to claim 15, wherein the pressure loss at the interface of the membrane and engaging means is increased by selecting a membrane made of aluminum having a thickness of between 26 and 40 microns.

18. The method according to claim 17, wherein the pressure loss at the interface of the membrane and engaging means is increased by selecting an aluminum membrane having a thickness of about 30 microns.

19. The method according to claim 15, wherein coffee is ground using radially corrugated rolls or using radially and axially corrugated rolls.

20. The method according to claim 15, wherein the coffee extract is delivered in a flow time between 27 and 35 seconds.

* * * * *

UNITED STATES PATENT AND TRADEMARK OFFICE
CERTIFICATE OF CORRECTION

PATENT NO. : 8,088,423 B2  
APPLICATION NO. : 12/374819  
DATED : January 3, 2012  
INVENTOR(S) : Ohresser et al.

Page 1 of 1

It is certified that error appears in the above-identified patent and that said Letters Patent is hereby corrected as shown below:

<u>Column 10:</u>
Line 23 (claim 4, line 1), after "claim" change "1" to -- 3 --.

Signed and Sealed this
Fourteenth Day of February, 2012

David J. Kappos
*Director of the United States Patent and Trademark Office*